(12) United States Patent
Mizuno et al.

(10) Patent No.: US 10,214,160 B2
(45) Date of Patent: Feb. 26, 2019

(54) WIRE MODULE AND WIRE PROTECTION MEMBER

(71) Applicants: AutoNetworks Technologies, Ltd., Yokkaichi, Mie (JP); Sumitomo Wiring Systems, Ltd., Yokkaichi, Mie (JP); SUMITOMO ELECTRIC INDUSTRIES, LTD., Osaka-shi, Osaka (JP)

(72) Inventors: Housei Mizuno, Mie (JP); Yasuyuki Yamamoto, Mie (JP); Shinya Sadohara, Mie (JP)

(73) Assignees: AutoNetworks Technologies, Ltd., Yokkaichi, Mie (JP); Sumitomo Wiring Systems, Ltd., Yokkaichi, Mie (JP); SUMITOMO ELECTRIC INDUSTRIES, LTD., Osaka-shi, Osaka (JP)

( * ) Notice: Subject to any disclaimer, the term of this patent is extended or adjusted under 35 U.S.C. 154(b) by 0 days.

(21) Appl. No.: 15/577,208

(22) PCT Filed: Jun. 2, 2016

(86) PCT No.: PCT/JP2016/066359
§ 371 (c)(1),
(2) Date: Nov. 27, 2017

(87) PCT Pub. No.: WO2016/203969
PCT Pub. Date: Dec. 22, 2016

(65) Prior Publication Data
US 2018/0170287 A1 Jun. 21, 2018

(30) Foreign Application Priority Data
Jun. 18, 2015 (JP) .................. 2015-122824

(51) Int. Cl.
H01B 7/00 (2006.01)
B60R 16/02 (2006.01)
(Continued)

(52) U.S. Cl.
CPC ....... B60R 16/0215 (2013.01); H01B 7/0045 (2013.01); H02G 3/04 (2013.01); H02G 3/263 (2013.01); H02G 3/38 (2013.01)

(58) Field of Classification Search
CPC .................................. F16L 3/06; H01B 7/00
(Continued)

(56) References Cited

U.S. PATENT DOCUMENTS

| 2,896,887 A | * | 7/1959 | Beltz | F16B 7/0433 |
| | | | | 248/300 |
| 5,116,179 A | * | 5/1992 | Matlock | F16B 15/0046 |
| | | | | 411/466 |

(Continued)

FOREIGN PATENT DOCUMENTS

| JP | H0946851 A | 2/1997 |
| JP | 2012239313 A | 12/2012 |

(Continued)

OTHER PUBLICATIONS

International Preliminary Report on Patentability for Application No. PCT/JP2016/066359 dated Feb. 16, 2017; 13 pages.

(Continued)

*Primary Examiner* — Chau N Nguyen
(74) *Attorney, Agent, or Firm* — Reising Ethington, P.C.

(57) ABSTRACT

A wire module includes multiple wires and a wire protection member including a supporting plate portion with a main surface on which the multiple wires can be arranged. A partitioning portion that partitions the plurality of wires in a width direction of the supporting plate portion is formed due to the supporting plate portion being partially cut and raised.

(Continued)

A partitioning plate portion includes a first partitioning portion and a second partitioning portion that are cut and raised from mutually opposite sides in the width direction of the supporting plate portion and come into contact with each other in directions of supporting each other in their upright states, in a state of being mutually upright.

5 Claims, 3 Drawing Sheets

(51) Int. Cl.
    *H02G 3/04* (2006.01)
    *H02G 3/00* (2006.01)
    *H02G 3/38* (2006.01)

(58) Field of Classification Search
    USPC .................. 174/503, 72 A; 248/65, 68.1
    See application file for complete search history.

(56) References Cited

U.S. PATENT DOCUMENTS

| | | | | |
|---|---|---|---|---|
| 5,743,497 A | * | 4/1998 | Michael | F16L 3/223 248/316.7 |
| 5,752,682 A | * | 5/1998 | Anderson | H02G 3/26 248/316.7 |
| 6,375,129 B2 | * | 4/2002 | Koziol | H02G 3/26 174/662 |
| 6,382,569 B1 | * | 5/2002 | Schattner | F16L 3/04 248/220.41 |
| 6,423,898 B1 | * | 7/2002 | Croker | G02B 6/4478 174/50 |
| 6,427,290 B1 | * | 8/2002 | Liu | B65H 75/36 24/16 R |
| 6,513,764 B2 | * | 2/2003 | Koziol | F16L 3/04 248/49 |
| 2001/0030266 A1 | * | 10/2001 | MacDonald | H05K 7/1448 248/65 |

FOREIGN PATENT DOCUMENTS

| | | |
|---|---|---|
| JP | 2014117099 A | 6/2014 |
| JP | 2015082966 A | 4/2015 |

OTHER PUBLICATIONS

International Search Report for Application No. PCT/JP2016/066359 dated Jun. 28, 2016; 5 pages.

* cited by examiner

WIRE MODULE AND WIRE PROTECTION MEMBER

CROSS REFERENCE TO RELATED APPLICATIONS

This application claims the priority of Japanese patent application JP2015-122824 filed on Jun. 18, 2015, the entire contents of which are incorporated herein.

TECHNICAL FIELD

The present invention relates to a technique for protecting wires.

BACKGROUND ART

Patent Document 1 (JP2014-117099A) discloses a wire harness that includes: a wire bundle; a wire supporting member that linearly supports the wire bundle; and a fixing means for fixing the wire supporting member to a routing path. It is disclosed that a corrugated plastic sheet is used as the wire supporting member.

SUMMARY

However, there is a problem in that if multiple wires are supported on a main surface of the wire supporting member, the multiple wires tend to bulge at the central portion in the width direction of the wire supporting member.

In view of this, the present design aims to make it possible to support multiple wires in a state of being as flat as possible on a supporting plate portion of a wire protection member.

In order to resolve the above-described problem, a wire module according to a first aspect includes: a plurality of wires; and a wire protection member including a supporting plate portion with a main surface on which the plurality of wires are arranged, wherein a partitioning portion that partitions the plurality of wires in a width direction of the supporting plate portion is formed due to the supporting plate portion being partially cut and raised. Also, the wire module further includes a bundling member that bundles the plurality of wires together with the supporting plate portion in a state of applying a force of pressing the plurality of wires to one main surface of the supporting plate portion and drawing the plurality of wires to the center in the width direction of the supporting plate portion, with the plurality of wires partitioned by the partitioning portion in the width direction of the supporting plate portion.

A second aspect is the wire module according to the first aspect, wherein the partitioning portions are provided at a plurality of locations in the width direction of the supporting plate portion.

A third aspect includes: a plurality of wires; and a wire protection member that includes a supporting plate portion with a main surface on which the plurality of wires are arranged, wherein a partitioning portion that partitions the plurality of wires in a width direction of the supporting plate portion is formed due to the supporting plate portion being partially cut and raised, and the partitioning portion includes a first partitioning portion and a second partitioning portion that are cut and raised from mutually opposite sides in the width direction of the supporting plate portion and come into contact with each other in directions of supporting each other in their upright states, in a state of being mutually upright.

A fourth aspect is the wire module according to the third aspect, wherein the first partitioning portion and the second partitioning portion are formed into shapes that are wider at their leading end portions than at their base end portions, and portions that are wide at the leading end portions thereof come into contact with each other in a state in which the first partitioning portion and the second partitioning portion are mutually upright.

A fifth aspect is the wire module according to any one of the first to fourth aspects, wherein the protection sheet is formed using a hollow plate material that includes a plurality of plate-shaped portions and an interposed portion that is arranged between the plurality of plate-shaped portions and forms a hollow space between the plurality of plate-shaped portions.

A wire protection member according to a sixth aspect includes a supporting plate portion with a main surface on which a plurality of wires can be arranged, wherein a partitioning portion that partitions the plurality of wires in a width direction of the supporting plate portion is formed due to the supporting plate portion being partially cut and raised. Also, the partitioning portion includes a first partitioning portion and a second partitioning portion that are cut and raised from mutually opposite sides in the width direction of the supporting plate portion and come into contact with each other in directions of supporting each other in their upright states, in a state of being mutually upright.

According to the first to sixth aspects, multiple wires can be supported on a supporting plate portion in a state in which the multiple wires are partitioned in the width direction of the supporting plate portion by a partitioning portion. Since the positions of the multiple wires are restricted to certain positions in the width direction of the supporting plate portion by the partitioning portion, the multiple wires can be supported in a state of being as flat as possible on the supporting plate portion.

According to the second aspect, since the positions of the multiple wires are restricted to certain positions in the width direction of the supporting plate portion at multiple locations in the width direction of the supporting plate portion, the multiple wires can be supported on the supporting plate portion in a state of being flatter.

According to the third aspect, since the partitioning portion includes a first partitioning portion and a second partitioning portion that are cut and raised from mutually opposite sides in the width direction of the supporting plate portion and come into contact with each other in directions of supporting each other in their upright states, in a state of being mutually upright, the cut and raised first supporting portion and second supporting portion are kept in a state of standing upright on the support plate portion. For this reason, the multiple wires can be easily arranged on the supporting plate portion while being partitioned by the partitioning portion.

According to the fourth aspect, since the wide portions at the leading end portions of the first partitioning portion and the second partitioning portion are in contact with each other in a state in which the first partitioning portion and the second partitioning portion are both upright, the support strength of the first partitioning portion and the second partitioning portion can be increased, and the first partitioning portion and the second partitioning portion can be brought into contact with each other.

According to the fifth aspect, a wire protection member with excellent lightness and strength can be obtained.

DESCRIPTION OF EMBODIMENTS

Hereinafter, a wire module and a wire protection member according to an embodiment will be described.

Figure 1:
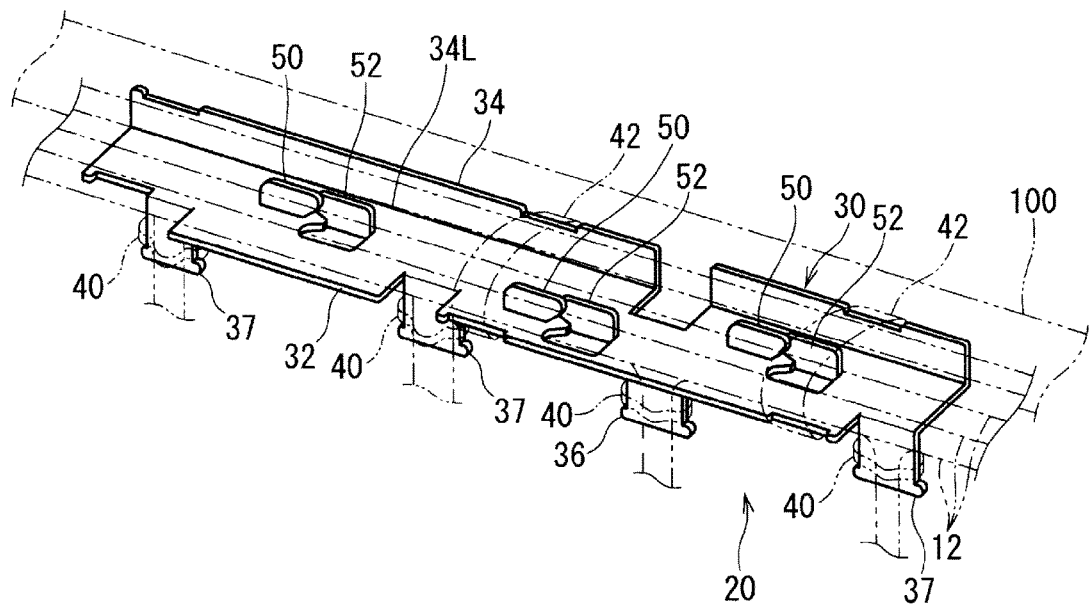
FIG. 1 is a schematic perspective view showing a wire module according to an embodiment.
Figure 2:
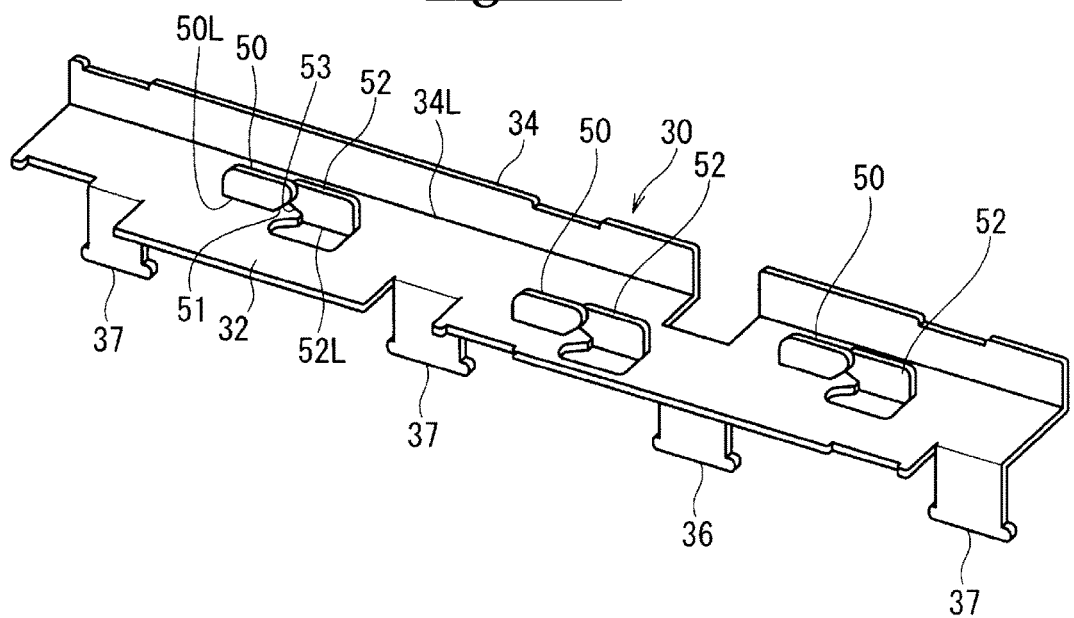
FIG. 2 is a schematic perspective view showing a wire protection member.
Figure 3:
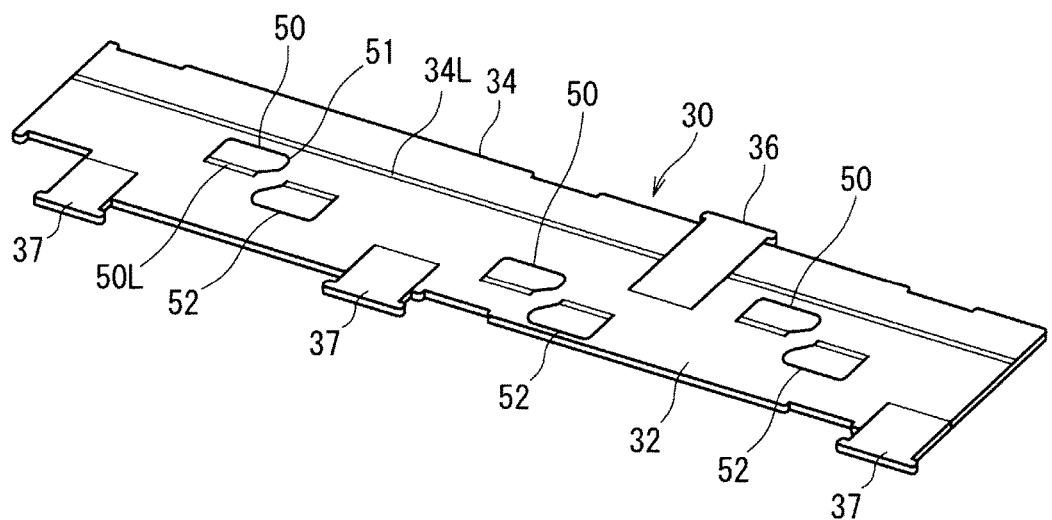
FIG. 3 is a perspective view showing an expanded state of the wire protection member.
Figure 4:
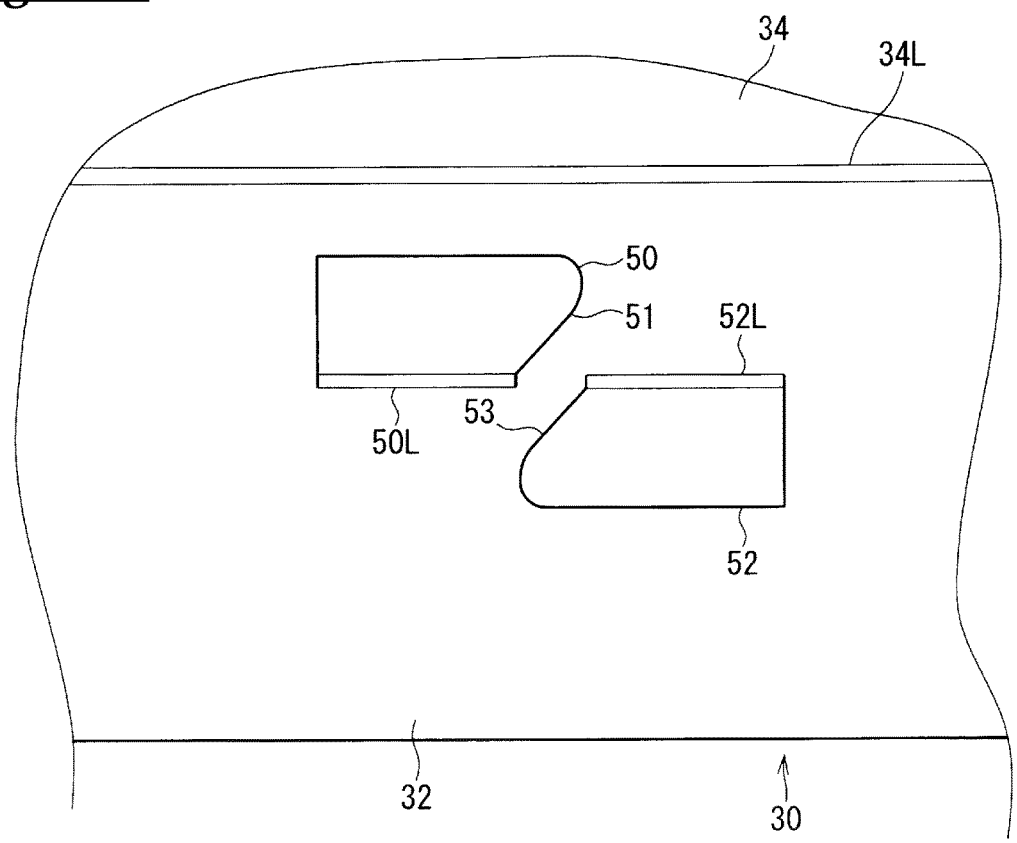
FIG. 4 is a partial expanded view of FIG. 3.
Figure 5:
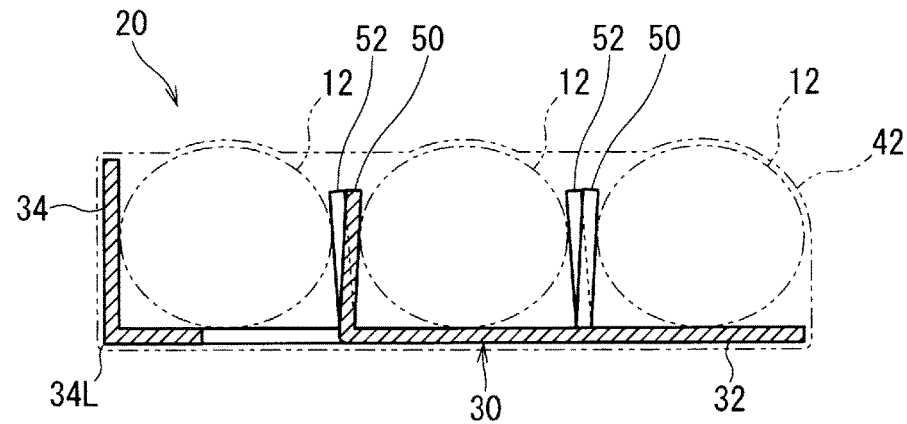
FIG. 5 is a schematic cross-sectional view showing a state in which the wire protection member partitions multiple wires.

FIG. 1 is a schematic perspective view showing a wire module 20, FIG. 2 is a schematic view showing a wire protection member 30, FIG. 3 is a perspective view showing an expanded state of the wire protection member 30, FIG. 4 is a partially enlarged view of FIG. 3, and FIG. 5 is a schematic cross-sectional view showing a state in which the wire protection member 30 partitions multiple wires 12. Note that in FIG. 5, the region indicated as the cutting location of the cross-sectional view is denoted by diagonal lines, regardless of the structure of the plate material that constitutes the wire protection member 30, and the outlines of the group of partitioned wires 12 are illustrated as two-dot chain lines.

The wire module 20 includes the multiple wires 12 and the wire protection member 30.

Insulation coverings are formed around the cores of the wires 12. Fiber optic cables or the like may be arranged along the multiple wires 12. The wires 12 are used as wire materials for electrically connecting various electrical components in a vehicle or the like.

The wire protection member 30 is formed using a bendable plate-shaped member and includes a supporting plate portion 32 with a main surface on which the multiple wires 12 are arranged.

Here, the wire protection member 30 includes the supporting plate portion 32, a side wall portion 34, and wire stopper pieces 36 and 37.

The supporting plate portion 32 is formed into an elongated plate shape and the multiple wires 12 are arranged thereon in the extension direction thereof.

The side wall portion 34 is formed into an elongated plate shape and is provided continuously on the support plate portion 32 via a linear bending line 34L. The side wall portion 34 protrudes toward one main surface (here, the upper side) of the supporting portion 32 in an orientation perpendicular to the supporting plate portion 32.

The wire stopper piece 36 is formed on one side portion of the supporting plate portion 32. More specifically, the wire stopper piece 36 is formed by forming a pair of slits that are orthogonal to the extension direction and extend from the side wall portion 34 to one side portion of the support plate portion 32 at the one side portion of the supporting plate portion 32 and a portion in the extension direction of the side wall portion 34, and bending the location at which the pair of slits were formed toward the other main surface (here, downward) of the supporting plate portion 32. The leading end portion of the wire stopper piece 36 is formed so as to be wider than the central portion thereof. Also, a portion of the multiple wires 12 supported on the supporting plate portion 32 is branched and pulled out toward the other main surface of the support plate portion 32 at the portion at which the wire stopper piece 36 is formed. Due to a bundling member 40 such as adhesive tape or a bundling belt being bundled to the wire 12 and the wire stopper piece 36, the wire 12 is fixed to the wire stopper piece 36.

The wire stopper pieces 37 are formed on another side portion of the supporting plate portion 32. More specifically, by forming pairs of slits that are orthogonal to the extension direction of the supporting plate portion 32 and extend inward from an edge portion on one side of the supporting plate portion 32 at portions in the extension direction on the other end portion of the supporting plate portion 32 and bending the locations at which the pairs of slits were formed toward the other main surface (here, downward) of the supporting plate portion 32, the wire stopper pieces 37 are formed. Here, the wire stopper pieces 37 are formed with gaps therebetween along the extension direction of the supporting plate portion 32, but this is not essential.

The leading end portions of the wire stopper pieces 37 are formed so as to be wider than the central portions thereof. Also, portions of the multiple wires 12 supported on the supporting plate portion 32 are branched and pulled out toward the other main surface of the support plate portion 32 at the portions at which the wire stopper pieces 37 are formed. Due to the bundling members 40 such as adhesive tape or bundling belts being bundled to the wires 12 and the wire stopper pieces 37, the wires 12 are fixed to the wire stopper pieces 37.

Note that it is not essential to provide the wire stopper pieces 36 and 37.

The wires 12 are supported on the wire protection member 30 as follows. That is, the multiple wires 12 are arranged on one main surface of the supporting plate portion 32. The multiple wires 12 are arranged in a parallel state along the extension direction of the supporting plate portion 32, aside from the portions at which they are branched and pulled out at the wire stopper pieces 36 and 37. Portions of the multiple wires 12 are branched and pulled outward at the portions at which the wire stopper pieces 36 and 37 are provided.

The multiple wires 12 arranged in the parallel state on the supporting plate portion 32 are bundled together with the supporting plate portion 32 by bundling members 42 such as adhesive tape or cable ties. Accordingly, the multiple wires are supported on the supporting plate portion 32 in a state of being spread out on the supporting plate portion 32.

Note that depressions formed on the other side of the supporting plate portion 32 and the edge portion of the side wall portion 34 are depressions for suppressing misalignment of the bundling members 42.

The bundling members 42 can press the multiple wires 12 to one main surface of the support plate portion 32. Note that the pressing power is relatively strong at the two sides in the width direction of the supporting plate portion 32, but is relatively weak at the center in the width direction of the supporting plate portion 32. Moreover, the bundling members 42 also apply a force that draws the multiple wires 12 toward the center in the width direction of the support plate portion 32. For this reason, the multiple wires are drawn to the center in the width direction of the supporting plate portion 32, and there is a risk that the multiple wires will bulge at the central portion in the width direction of the supporting plate portion 32.

In view of this, the supporting plate portion 32 is partially cut and raised, whereby first partitioning portions 50 and second partitioning portions 52 that partition the multiple wires 12 in the width direction of the supporting plate portion 32 are provided.

More specifically, the first partitioning portions 50 and the second partitioning portions 52 are provided at multiple locations in the width direction of the supporting plate portion 32. Here, they are provided at positions that divide the supporting plate portion 32 into three in the width direction. More specifically, if two lines that divide the supporting plate portion 32 into three in the width direction thereof are envisioned, the first partitioning portions 50 and the second partitioning portions 52 are provided at two respective locations with a gap therebetween on the line near one side (the line near the side wall portion 34). Also, a first partitioning portion 50 and a second partitioning portion 52 are provided at one location on the line near the other side (the line away from the side wall portion 34). The first partitioning portion 50 and the second partitioning portion 52 on the line near the other side are provided so as to be located between the first partitioning portions 50 and the second partitioning portions 52 provided at the two locations on the line near the one side, in the extension direction of the supporting portion plate 32.

For this reason, the multiple wires 12 are positioned in a state of being partitioned at certain locations by the first partitioning portions 50 and the second partitioning portions 52 at two locations in the width direction of the supporting plate portion 32.

Note that the multiple wires may be positioned in a state of being partitioned at certain locations by the partitioning portions at a greater number of locations in the width direction of the supporting plate portion. Also, the multiple wires may be positioned in a state of being partitioned at a certain location by the partitioning portions at one location in the width direction of the supporting plate portion.

Also, the first partitioning portions 50 and the second partitioning portions 52 are configured to be cut and raised from mutually opposite sides in the width direction of the supporting plate portion 32 and to be in contact with each other in directions of supporting each other in their upright states, in a state of being mutually upright.

More specifically, the first partitioning portions 50 are formed by cutting the outer circumferences at portions of the supporting plate portion 32 with portions of the outer circumferences leftover, and bending them toward the one main surface of the support plate portion 32 using the uncut portions as bending lines 50L. The bending lines 50L are lines that extend in the extension direction of the supporting plate portion 32, and accordingly, in the state in which the first partitioning portions 50 are cut and raised, the first partitioning portions 50 are upright in an orientation of extending in the extension direction of the supporting plate portion 32.

Also, the second partitioning portions 52 are formed by cutting the outer circumferences at portions of the supporting plate portion 32 with portions of the outer circumferences leftover and bending them toward the one main surface of the support plate portion 32 using the uncut portions as bending lines 52L. The bending lines 52L are lines that extend in the extension direction of the supporting plate portion 32, and accordingly, in the state in which the second partitioning portions 52 are cut and raised, the second partitioning portions 52 are upright in an orientation of extending in the extension direction of the supporting plate portion 32.

The first partitioning portions 50 and the second partitioning portions 52 are formed at adjacent positions in the extension direction of the supporting plate portion 32. The bending lines 50L of the first partitioning portions 50 and the bending lines 52L of the second partitioning portions 52 are adjacent with gaps therebetween in the extension direction of the supporting plate portion 32.

Also, the first partitioning portions 50 are formed by cutting around portions near one side (portions on the side wall portion 34 side) of the supporting plate portion 32 relative to the bending lines 50L, and the second partitioning portions 52 are formed by cutting around portions near the other side (portions on the side opposite to that of the first partitioning portions 50) of the supporting plate portion 32 relative to the bending lines 52L.

Accordingly, the first partitioning portions 50 are bent up from one side of the supporting plate portion 32, and the second partitioning portions 52 are bent up from the other side of the supporting plate portion 32, which is the side opposite to the one side. Also, when the first partitioning portions 50 and the second partitioning portions 52 are bent up in an orientation of being approximately orthogonal to the other portions of the supporting plate portion 32, the first partitioning portions 50 and the second partitioning portions 52 can be arranged along approximately the same plane.

Also, in this manner, in a state in which the first partitioning portions 50 and the second partitioning portions 52 are bent up, the first partitioning portions 50 and the second partitioning portions 52 are formed into shapes that can come into contact with each other.

Here, side edge portions 51, which are on the sides of the first partitioning portions 50 that are near the second partitioning portions 52, are formed into shapes that are outwardly inclined toward the leading end, and accordingly, portions at which the side edge portions 51 of the first partitioning portions 50 are formed are formed into shapes that gradually widen from the base end portions to the leading end portions.

Also, side edge portions 53, which are on the sides of the second partitioning portions 52 that are near the first partitioning portions 50, are formed into shapes that are outwardly inclined toward the leading end, and accordingly, portions at which the side edge portions 53 of the second partitioning portions 52 are formed are formed into shapes that gradually widen from the base end portions to the leading end portions. Accordingly, in a state in which the first partitioning portions 50 and the second partitioning portions 52 are bent up, the leading end portions of the side edge portions 51 and the leading end portions of the side edge portions 53 are in contact with each other. Also, the leading end portions of the side edge portions 51 are arranged on the other side of the supporting plate portion 32, and the leading end portions of the side edge portions 53 are arranged on the one side of the supporting plate portion 32, while the leading end portions of the side edge portions 51 and the leading end portions of the side edge portions 53 are elastically deformed. Upon doing so, even if the first partitioning portions 50 attempt to return to their original cut-out traces, or even if the second partitioning portions 52 attempt to return to their original cut-out traces, the leading end portions of the side edge portions 51 and the leading end portions of the side edge portions 53 come into contact with each other. Accordingly, due to the first partitioning portions 50 and the second partitioning portions 52 coming into contact with each other in directions of supporting each other in their upright states, the first partitioning portions 50 and the second partitioning portions 52 are supported in their upright states.

Note that the portions at which the side edge portions 51 of the first partitioning portions 50 are formed and the portions at which the side edge portions 53 of the second partitioning portions 52 are formed do not necessarily need to be formed into shapes that gradually become wider, and may be formed such that the leading end side portions become wider via step portions.

Also, here, a configuration is used in which the multiple wires 12 are supported by combinations of the first partitioning portions 50 and the second partitioning portions 52 at certain positions in the partitioned state, but it is also possible to use a configuration in which the multiple wires 12 are supported at certain positions in the partitioned state by one partitioning portion.

Figure 6:
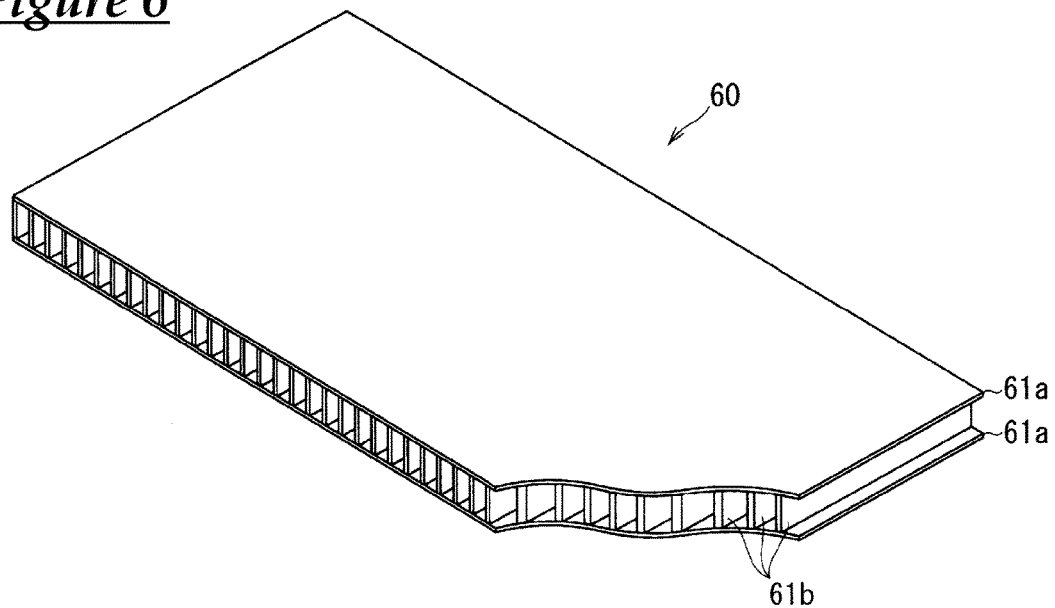
FIG. 6 is a partial cut-out perspective view showing an example of a hollow plate material.

As the plate member forming the wire protection member 30, it is also possible to use a plate member that can maintain a flat plate form to a certain extent and is capable of bending. As the plate member, for example, as shown in FIG. 6, it is preferable to use a hollow plate material 60 obtained by forming a hollow space between a plurality of plate-shaped portions. This is because a wire protection member 30 with excellent lightness and strength can be obtained if a plate material having this hollow structure is used.

A hollow plate material 60 shown in FIG. 6 includes multiple (here, two) plate-shaped portions 61a and interposed portions 61b interposed between the multiple plate-shaped portions 61a.

The material forming the multiple plate-shaped portions 61a and the interposed portions 61b is not particularly limited. The multiple plate-shaped portions 61a and the interposed portions 61b may be formed of paper, may be formed of resin, or may be constituted by a combination thereof. If at least one of the multiple plate-shaped portions 61a and the interposed portions 61b is formed of paper, it is preferable to carry out a water repellent treatment or the like on the surface thereof.

The plate-shaped portion 61a is formed into a flat plate shape. The multiple plate-shaped portions 61a are joined in a state of having a gap therebetween via the interposed portions 61b.

Here, the multiple interposed portions 61b are provided between the multiple plate-shaped portions 61a in a parallel state with gaps therebetween.

The interposed portions 61b are formed into elongated plate shapes and are connected to the plate-shaped portions 61a in an orientation of being orthogonal to the plate-shaped portions 61a on both sides.

For this reason, when the hollow plate material 60 is cut with a plane that is orthogonal to the extension direction of the interposed portions 61b, a ladder-shaped cross-section, in which the multiple interposed portions 61b are parallel between the pair of plate-shaped portions 61a is shown.

The example of the plate material having the hollow structure is not limited to the above-described example. For example, the plate material may be configured such that interposed portions in which peaks and troughs are continuous in the form of waves are interposed between multiple plate-shaped portions. Alternatively, the plate material may be configured such that interposed portions that exist between multiple plate-shaped portions form a hollow shape in the form of a polygonal prism such as a triangular prism, and in particular, the plate material may form a honeycomb structure.

A plate material that is formed of resin and has this kind of hollow structure is called corrugated plastic.

As the plate material forming the wire protection member 30, in addition to the above-described hollow plate material, it is also possible to use a non-woven sheet that is hardened by hot-pressing a non-woven member, a plate material made of resin (a plate material made of resin that does not have a hollow structure), a plate material having a foam structure, a plate material made of paper, or the like.

An example of a method for manufacturing the wire module 20 will be described.

First, a plate material punched into the shape shown in FIG. 3 is prepared and bent. Specifically, the portion between the supporting plate portion 32 and the side wall portion 34, the base end portions of the wire stopper pieces 36 and 37, and the base end portions of the first partitioning portions 50 and the second partitioning portions 52 are bent. Also, the first partitioning portions 50 and the second partitioning portions 52 are brought into contact with each other in directions of supporting each other in their upright states, as follows.

In this state, the multiple wires 12 are arranged along the extension direction of the supporting plate portion 32 and a portion thereof is pulled outward at the portion at which the wire stopper pieces 36 and 37 are formed. When the multiple wires 12 are arranged along the extension direction of the supporting plate portion 32, the multiple wires 12 are divided as equally as possible by the first partitioning portions 50 and the second partitioning portions 52. Note that if the first partitioning portions 50 and the second partitioning portions 52 are not formed at positions that equally divide the supporting plate portion 32 in the width direction, the multiple wires 12 are divided so as to be dispersed with concentrations that are as equal as possible, according to the width of partitioning by the first partitioning portions 50 and the second partitioning portions 52.

Then, the supporting plate portion 32 and the multiple wires 12 supported on the supporting plate portion 32 are bundled by the bundling members 42. At this time, the multiple wires 12 are partitioned in the width direction of the supporting plate portion 32 and are supported at certain positions by the first partitioning portions 50 and the second partitioning portions 52. For this reason, a circumstance in which the multiple wires 12 are drawn to the center in the width direction of the supporting plate portion 32 is not likely to occur, and accordingly, the multiple wires 12 are supported so as to be as flat as possible on the supporting plate portion 32.

Also, the wire stopper pieces 36 and 37 and the wires 12 are bundled by the bundling members 40. Accordingly, the wires 12 extending in a branched manner toward the outside are supported at certain positions in the wire protection member 30. Accordingly, the wire module 20 is manufactured.

The manufactured wire module 20 is assembled in the vehicle. For example, a reinforcement 100 or the like located in front of a driver seat in the vehicle is envisioned as the location of assembly. The wire module 20 is fixed to the reinforcement 100 via double-sided tape, cable ties, clamps for fixing to the vehicle, or the like. Note that the location of assembly of the wire module 20 is not limited to the above-described example.

According to the wire module 20 and the wire protection member 30, which are constituted as described above, the multiple wires 12 can be supported on the supporting plate portion 32 with the wires 12 partitioned in the width direction of the supporting plate portion 32 by the first partitioning portions 50 and the second partitioning portions 52. For this reason, the positions of the multiple wires 12 are restricted at certain positions in the width direction of the supporting plate portion 32 by the first partitioning portions 50 and the second partitioning portions 52, and therefore the multiple wires 12 can be supported in a state of being as flat as possible on the supporting plate portion 32. As a result, the multiple wires 12 can be stored in a mode of being as flat as possible, and can be assembled in a wiring space or the like of the vehicle.

Also, since the first partitioning portions 50 and the second partitioning portions 52 are formed by cutting and raising the supporting plate portion 32, the configuration for partitioning the multiple wires can be formed easily. Note that the partitioning portions may be formed at the end portions of the supporting plate portion. Also, since the first partitioning portions 50 and the second partitioning portions 52 are formed by cutting and raising the supporting plate portions 32, the yield when forming the wire protection member 30 from the plate material also improves.

Also, since the positions of the multiple wires 12 are restricted to certain positions in the width direction of the supporting plate portion 32 at multiple locations in the width direction of the supporting plate portion 32, the multiple wires 12 can be supported in a state of being flatter on the supporting plate portion 32.

Also, the first partitioning portions 50 and the second partitioning portions 52 are cut and raised from mutually opposite sides in the width direction of the supporting plate portion 32 and are in contact with each other in the directions of supporting each other in their upright states, in a state of being mutually upright. For this reason, the cut and raised first partitioning portions 50 and second partitioning portions 52 are kept in the state of being mutually upright on the supporting plate portion 32, and the multiple wires 12 are partitioned by the first partitioning portions 50 and the second partitioning portions 52 and can be arranged easily on the supporting plate portion 32.

Moreover, the leading end portions of the side edge portions 51 and 53 of the first partitioning portions 50 and the second partitioning portions 52, which widen at their leading end portions, are in contact with each other in the state of being mutually upright. For this reason, the supporting strength can be increased as much as possible by making the punched-out areas of the first partitioning portions 50 and the second partitioning portions 52 as small as possible, and the first partitioning portions 50 and the second partitioning portions 52 can be kept in the upright state by coming into contact with each other.

Note that the configurations described in the embodiment and modified examples above can be combined as long as no discrepancies occur.

Although the present design was described in detail above, the description above is in all ways exemplary and the present invention is not limited thereto. It is to be understood that infinite variations that have not been described can be envisioned without departing from the scope of the claims.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

LIST OF REFERENCE NUMERALS

12 Wire
20 Wire module
30 Wire protection member
32 Supporting plate portion
40 Bundling member
50 First partitioning portion
50L Bending line
51 Side edge portion
52 Second partitioning portion
52L Bending line
53 Side edge portion
60 Hollow plate material

The invention claimed is:

1. A wire module, comprising:
a plurality of wires; and
a wire protection member including a supporting plate portion with a main surface on which the plurality of wires are arranged,
wherein a partitioning portion that partitions the plurality of wires in a width direction of the supporting plate portion is formed due to the supporting plate portion being partially cut and raised, and
the partitioning portion includes a first partitioning portion and a second partitioning portion that are cut and raised from mutually opposite sides in the width direction of the supporting plate portion and come into contact with each other in directions of supporting each other in their upright states, in a state of being mutually upright.

2. The wire module according to claim 1, wherein a plurality of partitioning portions are provided at a plurality of locations in the width direction of the supporting plate portion.

3. The wire module according to claim 1, wherein the first partitioning portion and the second partitioning portion are formed into shapes that are wider at their leading end portions than at their base end portions, and portions that are wide at the leading end portions thereof come into contact with each other in a state in which the first partitioning portion and the second partitioning portion are mutually upright.

4. The wire module according to claim 1, wherein the wire protection member is formed using a hollow plate material that includes a plurality of plate-shaped portions and an interposed portion that is arranged between the plurality of plate-shaped portions and forms a hollow space between the plurality of plate-shaped portions.

5. A wire protection member comprising
a supporting plate portion with a main surface on which a plurality of wires can be arranged,
wherein a partitioning portion that partitions the plurality of wires in a width direction of the supporting plate portion is formed due to the supporting plate portion being partially cut and raised, and the partitioning portion includes a first partitioning portion and a second partitioning portion that are cut and raised from mutually opposite sides in the width direction of the supporting plate portion and come into contact with each other in directions of supporting each other in their upright states, in a state of being mutually upright.

\* \* \* \* \*